United States Patent
Müller et al.

(10) Patent No.: US 9,510,259 B2
(45) Date of Patent: Nov. 29, 2016

(54) METHODS AND ARRANGEMENT FOR HANDLING A DATA TRANSFERRAL IN A CELLULAR NETWORK

(75) Inventors: Walter Müller, Upplands Väsby (SE); Zhiyi Xuan, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 14/353,440

(22) PCT Filed: Nov. 10, 2011

(86) PCT No.: PCT/SE2011/051344
§ 371 (c)(1),
(2), (4) Date: Apr. 22, 2014

(87) PCT Pub. No.: WO2013/070127
PCT Pub. Date: May 16, 2013

(65) Prior Publication Data
US 2014/0256311 A1    Sep. 11, 2014

(51) Int. Cl.
*H04W 36/30*    (2009.01)
*H04W 36/00*    (2009.01)
(Continued)

(52) U.S. Cl.
CPC .............. *H04W 36/30* (2013.01); *H04L 41/06* (2013.01); *H04W 24/08* (2013.01); *H04W 36/0055* (2013.01); *H04W 36/18* (2013.01)

(58) Field of Classification Search
CPC ... H04W 36/30; H04W 24/08; H04W 41/06; H04W 36/0055; H04W 36/18
See application file for complete search history.

(56) References Cited

U.S. PATENT DOCUMENTS

2011/0250892 A1   10/2011   Gupta et al.

2012/0014357 A1*  1/2012  Jung ................. H04L 5/0035
                                                    370/332
2014/0185552 A1*  7/2014  Lee .................. H04L 5/0039
                                                    370/329

FOREIGN PATENT DOCUMENTS

AU     2006301908 A1    4/2007
EP     1 973 368        9/2008
(Continued)

OTHER PUBLICATIONS

Extended European Search Report issued for Application No./Patent No. 11875507.3-1854 / 2777326 PCT/SE2011051344, Jun. 11, 2015.
3GPP TSG-RAN WG2 Meeting #72; Jacksonville, US; Change Request; Title: Stage 2 corrections for CA; Current Version 10.1.0 (R2-106357), Nov. 15-19, 2010.
(Continued)

Primary Examiner — Chuong A Ngo
(74) Attorney, Agent, or Firm — Baker Botts, LLP

(57) ABSTRACT

A method in a first base station (105) for handling a data transferral in a cellular network (100) is provided. The first base station (105) serves a user equipment (125) via a first cell (115). When the first base station (105) obtains an indication that a second cell (120) provides a coverage for the user equipment (125), the first base station (105) sends a message to a second base station (110) serving the second cell (120). The message commands the second base station (110) to prepare for receiving the uplink data from the user equipment (125) via the second cell (120). The first base station (105) also sends a request to the user equipment (125). The request commands the user equipment (125) to prepare for sending the uplink data both via the first cell (115) and via the second cell (120) in respective separate intra frequency transmissions.

34 Claims, 12 Drawing Sheets

(51) Int. Cl.
*H04L 12/24* (2006.01)
*H04W 24/08* (2009.01)
*H04W 36/18* (2009.01)

(56) References Cited

FOREIGN PATENT DOCUMENTS

| WO | WO 2007/089128 | 8/2007 |
| WO | WO 2007/149509 | 12/2007 |
| WO | WO 2011/109544 A1 | 9/2011 |

OTHER PUBLICATIONS

International Search Report for International Application No. PCT/SE2011/051344, Oct. 24, 2012.

PCT Written Opinion of the International Searching Authority issued for International Application No. PCT/SE2011/051344, Oct. 24, 2012.

"Uplink Coordinated Multi-Point Reception for LTE-Advanced Systems" by Dajie Jiang et al.; China Mobile Research Institute, Beijing, P.R. China, Sep. 2009.

* cited by examiner

METHODS AND ARRANGEMENT FOR HANDLING A DATA TRANSFERRAL IN A CELLULAR NETWORK

PRIORITY

This nonprovisional application is a U.S. National Stage Filing under 35 U.S.C, §371 of international patent application Ser. No. PCT/SE2011/051344, filed Nov. 10, 2011 and entitled "Methods and Arrangement for Handling A Data Transferred In A Cellular Network."

TECHNICAL FIELD

Embodiments herein relate to a base station, a method in a base station, a user equipment and a method in a user equipment. In particular, embodiments herein relate to handling a data transferral in a cellular network.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used.

The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, a base station as described above will be referred to as a base station or a Radio Base Station (RBS). A user equipment as described above, will in this disclosure be referred to as a user equipment or a UE.

The expression DownLink (DL) will be used for the transmission path from the base station to the user equipment. The expression UpLink (UL) will be used for the transmission path in the opposite direction i.e. from the user equipment to the base station.

Cellular communication networks evolve towards higher data rates, together with improved capacity and coverage. In 3GPP, standardization body technologies like GSM, HSPA and LTE have been and are currently developed.

To provide for mobility in the cellular network, the cellular network must perform so called handovers when the user equipment moves from one cell to another. A handover means that there is a change of serving cell for the user equipment from a so called source cell to a so called target cell. There are mechanisms in the cellular network to identify which cells are candidate target cells for handover. Typically, the user equipment regularly performs measurements to monitor which cells provide coverage at its current location. The measurement result is sent to a serving base station of the source cell in so called measurement reports. These measurement reports may be used to trigger a handover to the target cell in due time before the user equipment moves out of coverage from the source cell.

If the handover is triggered too early, the user equipment may not be able to connect to the target cell and there is a high probability for oscillating handovers.

If the handover is triggered too late the serving base station of the source cell may not receive the measurement report used for handover triggering, or the user equipment may not be able to receive a handover command from the serving base station of the source cell. Due to this, the handover may not be performed which may eventually lead to the user equipment moving out of coverage from the source cell, detecting a radio rink failure, and losing its radio link connection to the cellular network, causing for example an ongoing call or a download to terminate prematurely.

LTE is a so called frequency re-use 1 capable system, i.e. performance requirements and standardized solutions are such that adjacent cells may re-use the same frequency for transmission.

A problem is that, since re-use 1 planning of frequency is used, for example handover situations may become challenging in terms of interference, as the target cell transmission interfere with source cell transmission, which may result in unsatisfactory transferal of uplink and/or downlink data, such as for example a measurement report or a handover command, which is necessary for performing the handover. Failed transmissions of data may hence lead to too early or too late handovers, and/or to oscillating handovers and handover failures.

The problems with interfering transmissions causing failed transmissions of data are further stressed by the introduction of so called Heterogeneous Networks (HetNets).

In HetNets, high power base stations and low power base stations using the same frequency are deployed in the same area such that their coverage, or cells, in the cellular network overlap.

SUMMARY

In view of the discussion above, it is an object for embodiments herein to provide an improved way of handling a data transferal in a cellular network.

According to a first aspect, the object is achieved by a method in a first base station for handling a data transferral in a cellular network. The first base station serves a user equipment via a first cell in the cellular network. When the first base station obtains an indication that a second cell in the cellular network provides a coverage for the user equipment, the first base station sends a message to a second base station serving the second cell. The message commands the second base station to prepare for receiving the uplink data from the user equipment via the second cell. The first base station also sends a request to the user equipment. The request commands the user equipment to prepare for sending the uplink data both via the first cell and via the second cell. The request further commands that the uplink data is to be sent via first cell and via the second cell in respective separate intra frequency transmissions.

According to a second aspect, the object is achieved by a first base station for handling a data transferral in a cellular network. The first base station is configured to serve a user equipment via a first cell in the cellular network. The first base station comprises an obtaining unit configured to obtain an indication that a second cell in the cellular network provides a coverage for the user equipment. The first base station further comprises a sending unit configured to, when an indication that the second cell in the cellular network provides a coverage for the user equipment is obtained, send a message to a second base station serving the second cell. The message commands the second base station to prepare for receiving the uplink data from the user equipment via the second cell. The sending unit is further configured to, when the indication that the second cell in the cellular network provides a coverage for the user equipment is obtained, send a request to the user equipment. The request commands the user equipment to prepare for sending the uplink data both via the first cell and via the second cell. The request further commands that the uplink data is to be sent via first cell and via the second cell in respective separate intra frequency transmissions.

According to a third aspect, the object is achieved by a method in a second base station for handling a data transferral in a cellular network. The cellular network comprises a first base station that serves a user equipment via a first cell in the cellular network. The second base station serves a second cell in the cellular network. The second base station receives a message from the first base station. The message commands the second base station to prepare for receiving an uplink data from the user equipment via the second cell. The second base station prepares for receiving the uplink data from the user equipment via the second cell. The second base station then receives the uplink data from the user equipment via the second cell.

According to a fourth aspect, the object is achieved by a second base station for handling a data transferral in a cellular network. The cellular network comprises a first base station that serves a user equipment via a first cell in the cellular network. The second base station is configured to serve a second cell in the cellular network. The second base station comprises a sending unit and a receiving unit. The receiving unit is configured to receive a message from the first base station. The message commands the second base station to prepare for receiving an uplink data from the user equipment via the second cell. The second base station further comprises a preparing unit. The preparing unit is configured to prepare for receiving of the uplink data from the user equipment via the second cell.

According to a fifth aspect, the object is achieved by a method in a user equipment for handling a data transferral in a cellular network. The user equipment is served by a first base station via a first cell in the cellular network. The user equipment receives a request from the first base station. The request commands the user equipment to prepare for sending an uplink data both via the first cell and via a second cell comprised in the cellular network. The request further commands that the uplink data is to be sent via the first cell and via the second cell in respective separate intra frequency transmissions. The user equipment prepares for sending the uplink data via the first cell and via the second cell in respective separate intra frequency transmissions. The user equipment then sends the uplink data via the first cell and via the second cell in respective separate intra frequency transmissions.

According to a sixth aspect, the object is achieved by a user equipment for handling a data transferral in a cellular network. The user equipment is configured to be served by a first base station via a first cell in the cellular network. The user equipment comprises a sending unit and a receiving unit. The receiving unit is configured to receive a request from the first base station. The request commands the user equipment to prepare for sending an uplink data both via the first cell and via a second cell comprised in the cellular network. The request further commands that the uplink data is to be sent via the first cell and via the second cell in respective separate intra frequency transmissions. The user equipment further comprises a preparing unit. The preparing unit is configured to prepare for sending the uplink data via the first cell and via the second cell in respective separate intra frequency transmissions.

Thanks to the first base station sending the message and the request, the first base station, which is the serving base station for the user equipment, can initiate a transmission diversity in which the uplink data is sent from the user equipment in separate intra frequency transmissions both to the serving, first base station, and to the second base station. This increases the chances of the uplink transmission being successfully transmitted to a base station, and hence provides an improved way of handling a data transferral in the cellular network.

DETAILED DESCRIPTION

Figure 1A:
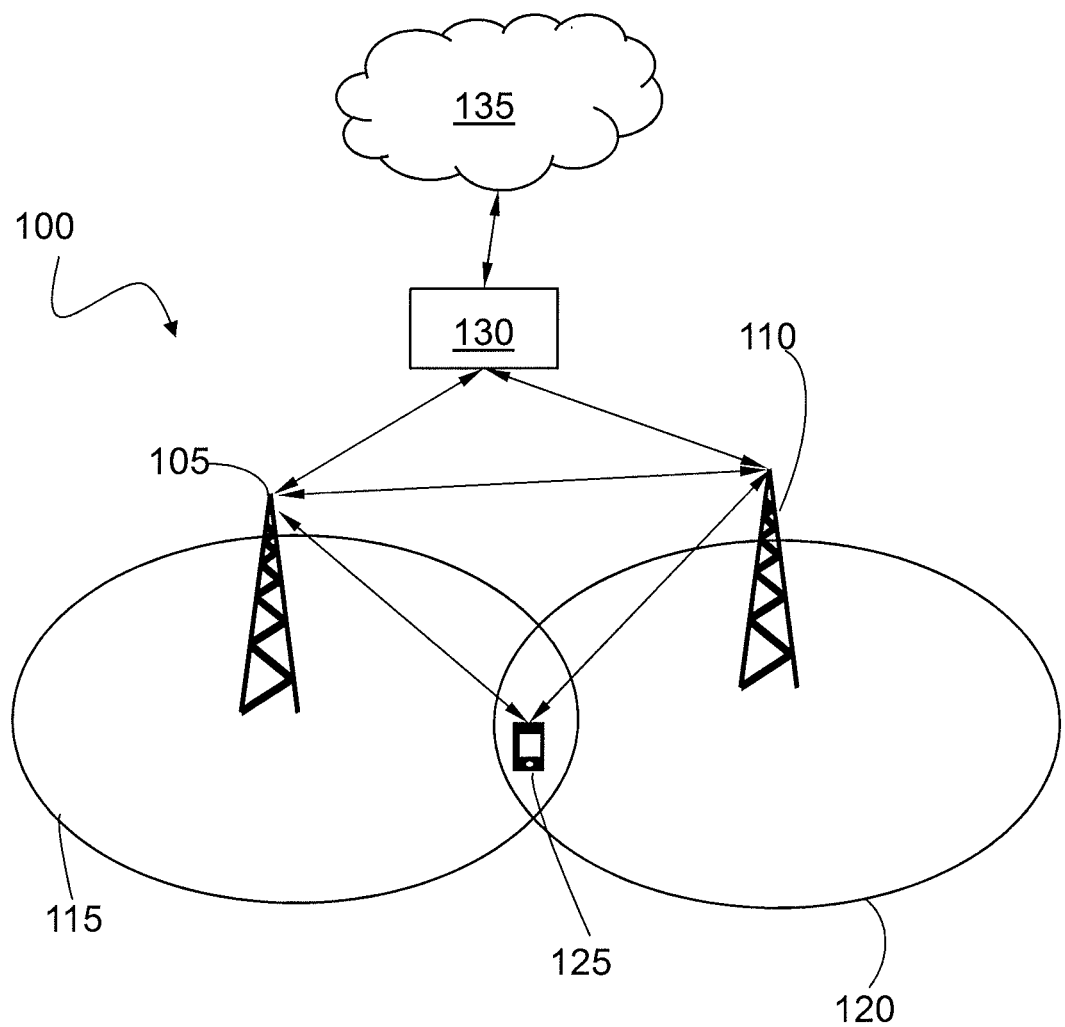
FIG. 1a is a schematic block diagram illustrating an embodiment of a cellular network.

FIG. 1a depicts a cellular network 100. The cellular network 100 may be an LTE cellular network.

The cellular network 100 comprises a first base station 105 and a second base station 110. The first base station 105 and the second base station 110 are, in this example, eNodeBs. The base station 105 and/or 110 may in other embodiments be of another type, and may be referred to by different names, such as for example eNodeB, RBS, NodeB, BTS, micro, pico or HetNet stations depending on the technology and terminology used.

The first base station 105 serves a first cell 115, and the second base station 110 serves a second cell 120 in the cellular network 100.

By "serving a cell" is understood wirelessly transmitting downlink data and/or receiving uplink data via radio communication in the cell to a user equipment comprised therein.

The cellular network 100 further comprises a user equipment 125. The user equipment 125 is located in the first cell 115 and is served by the first base station 105.

The user equipment 125 may be for example a communication device such as a mobile telephone, a cellular telephone, a dongle, a laptop, or a tablet computer, sometimes referred to as a surf plate, with wireless capability. The user equipment 125 may be a portable, pocket-storable, hand-held, computer-comprised, or vehicle-mounted mobile device, enabled to communicate voice and/or data, via the cellular network 100, with another entity, such as another mobile station or a server.

The cellular network 100 further comprises a core network 130. The core network 130 is connected to the internet 135.

Figure 1B:
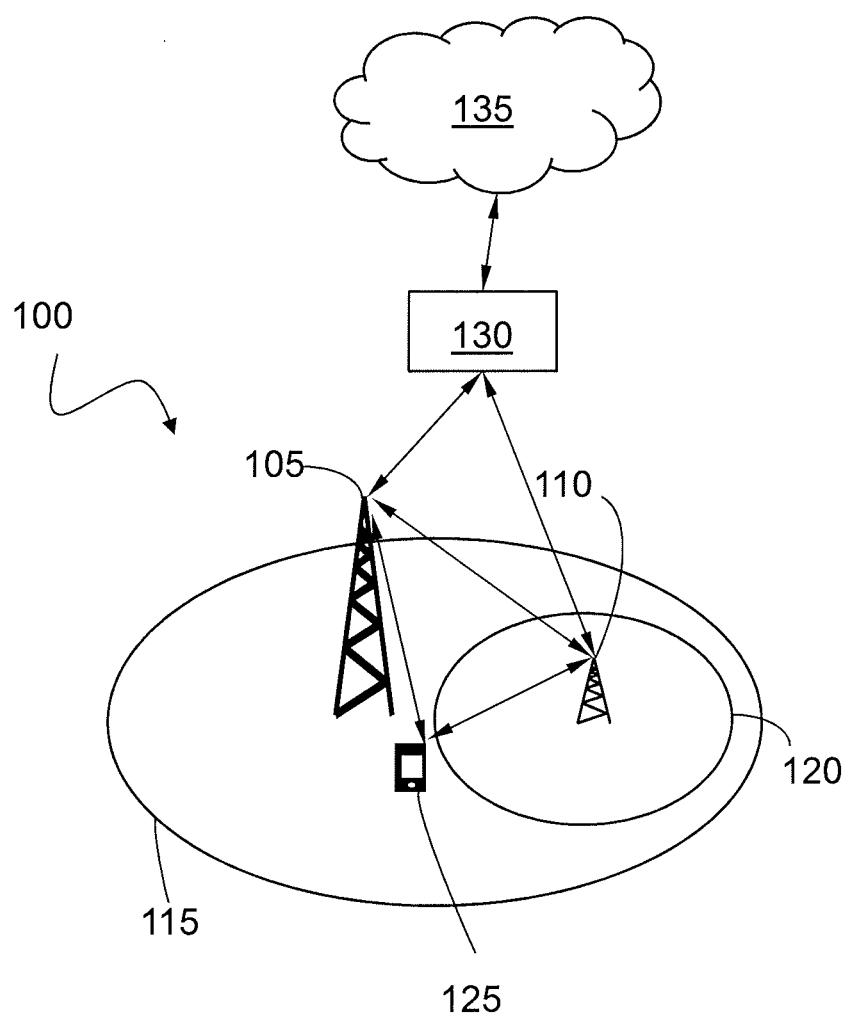
FIG. 1b is a schematic block diagram illustrating an embodiment of a cellular network.

FIG. 1b also schematically illustrates the cellular network 100 depicted in FIG. 1a. In this figure however, a so called heterogeneous network scenario is depicted, to illustrate that the first base station 105 and the second base station 110 may be of different classes such as e.g. macro eNodeB, home eNodeB or pico base station. In the illustrated example in FIG. 1b, the first base station 105 is a macro base station and the second base station 110 is a micro base station. In other embodiments, the second base station 110 may be a macro base station, and the first base station 105 may be a micro base station.

Figure 1C:
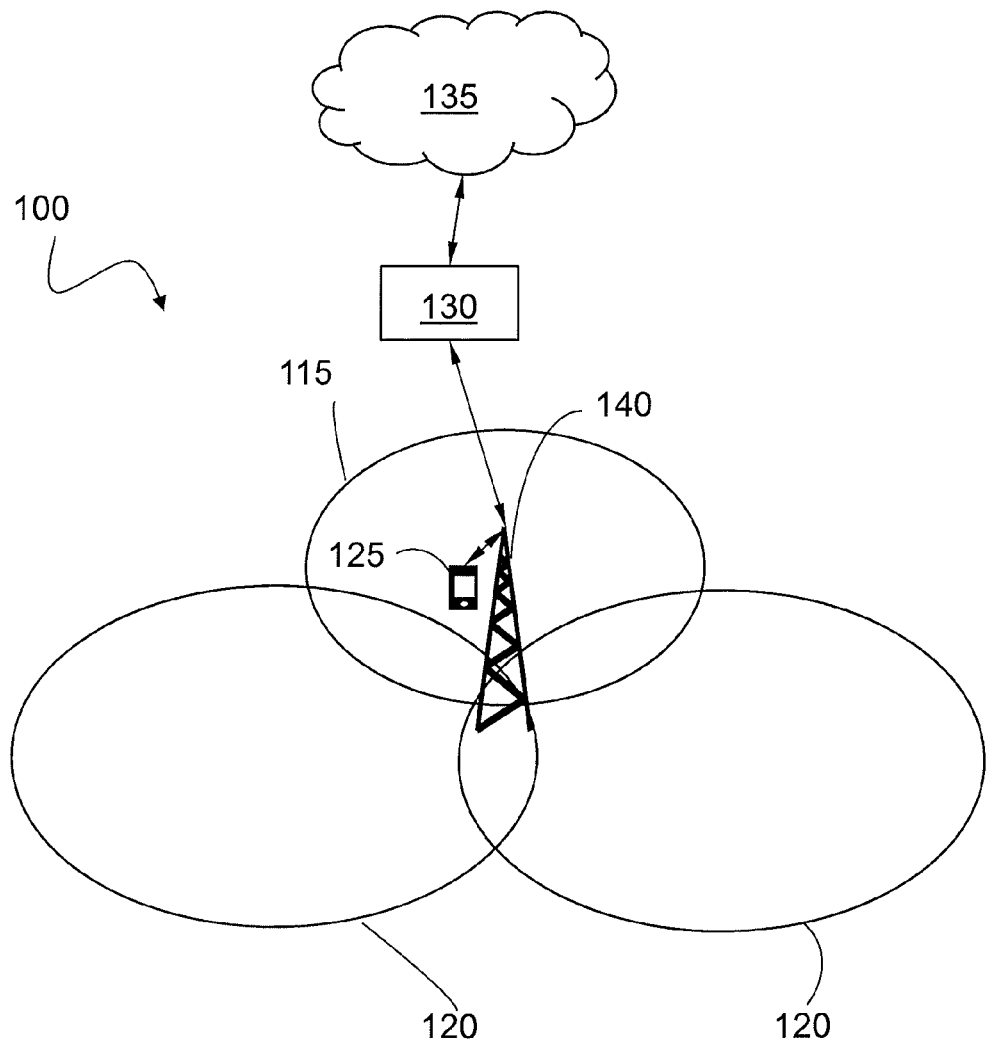
FIG. 1c is a schematic block diagram illustrating an embodiment of a cellular network.

FIG. 1c schematically illustrates yet another example of the cellular network 100. In this example, it is illustrated that the first base station 105 and the second base station 110 referred to herein may indeed be the same base station in the form of a single base station 140, serving both the first cell 115 and the second cell 120. FIG. 1c further illustrates that the second cell 120 may be represented by more than one second cell 120.

It is to be understood that the FIGS. 1a-1c are merely schematic examples, and that the cellular network 100 may indeed comprise several other radio network nodes, core network nodes, base stations and user equipments which are not shown in the FIGS. 1a-1c.

As part of the development towards embodiments herein, a problem will first be identified and discussed below, with reference to FIG. 1a-1c.

LTE is a so called frequency re-use 1 capable system, i.e. performance requirements and standardized solutions are such that adjacent cells may re-use the same frequency for transmission. That is, data transferals between the first base station 110 and the user equipment 125 that it is serving may fail due to interfering transmissions in the second cell 120.

This may be problematic for example in handover situations, as the target cell transmission interfere with source cell transmission, which may result in unsatisfactory transferal of uplink and/or downlink data, such as for example a measurement report or a handover command, which is necessary for performing the handover. Therefore a handover of the user equipment 125 from the first cell 115 to the second cell 120 may fail, leading to for example a dropped call or an interrupted download of data.

The problems with interfering transmissions causing failed transmissions of data are further stressed if the cellular network 100 is a heterogeneous networks such as illustrated in FIG. 1b, since in such networks the high power base stations and the low power base stations using the same frequency are deployed in the same area such that their coverage, or cells, in the cellular network 100 overlap.

Figure 2:
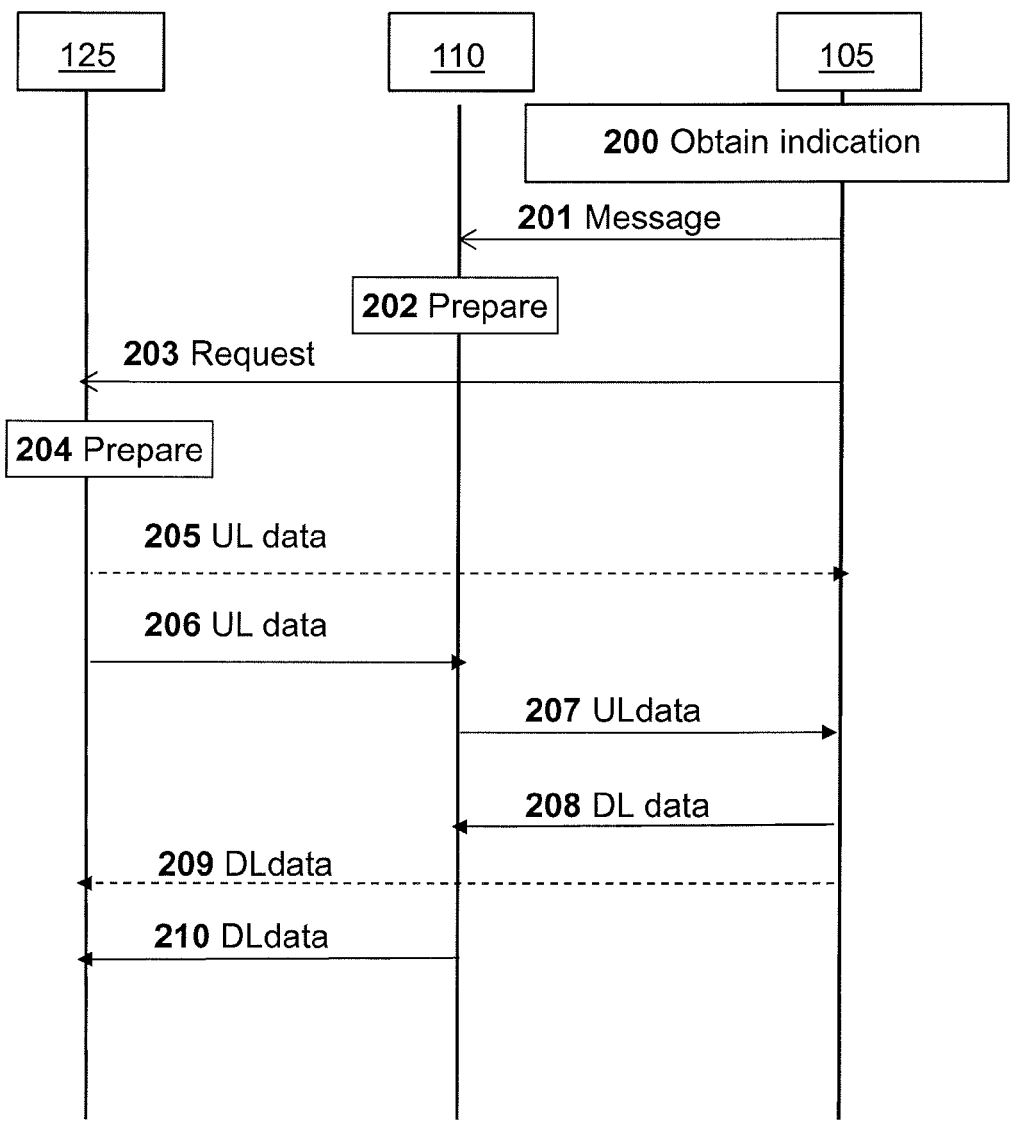
FIG. 2 is a combined signalling scheme and flowchart illustrating embodiments in a cellular network.

FIG. 2 is a combined signaling scheme and block diagram illustrating embodiments herein in a general way when implemented in the cellular network depicted in FIGS. 1a-1c.

In action 200 the first base station 105 obtains an indication that the second cell 120 provides a coverage for the user equipment 125. This means that the user equipment 125 is located within an area where there is radio coverage not only via the first cell 115, but also from the second cell 120. When obtaining this information, the first base station 105 initiates a transmission diversity, which may be referred to for example as a soft state, the function of which will be explained and exemplified in the following.

In action 201 the first base station 105 sends a message to the second base station 110. The message commands the second base station 110 to prepare for receiving an uplink transmission from the user equipment 125, even though this user equipment 125, as previously mentioned, is not served by the second base station 110, but by the first base station 105. In this example, the message further commands that the second base station 110 also prepare for sending a downlink data to the user equipment 125, and to forward any uplink data that is received from the user equipment 125 to the first base station 105. The message may be sent for example using an X2 or S1 interface, if the first base station 105 and the second base station 110 are not the same base station, or an internal interface if they are the same base station 140 as depicted in FIG. 1c.

In action 202, the second base station 110 that has received the message from the first base station 105 prepares for receiving the uplink data from the user equipment 125. The preparation may include for example accepting to schedule the uplink transmission from the user equipment 125 even though the user equipment 125 is served by another base station, that is, by the first base station 105 in this example. The second base station 110 also prepares for sending the downlink data to the user equipment 125, and to forward any received uplink data from the user equipment 125 to the first base station 105.

In the preparations, the second base station 110 prepares for scheduling an uplink transmission from the user equipment 125 via the second cell 120 upon receiving a scheduling request from the user equipment 125, even though the second cell 120 is not the serving cell for the user equipment 125. The second base station 110 also schedules a downlink transmission to the user equipment 125 via the second cell 120. The preparations may further comprise adding temporary user context and obtaining time alignment with the user equipment 125.

In action 203, the first base station 105 sends a request to the user equipment 125. The request commands the user equipment 125 to prepare for sending the uplink data not only to the serving base station 105 via the serving first cell 115, but also to send the same uplink data to the second base station 110 via the second cell 120.

The request commands the user equipment 125 to send the uplink data in separate intra frequency transmissions to the first base station 105 via the first cell 115 and to the second base station 110 via the second cell 120. This way, one of the transmissions may be performed in a better radio condition, and succeed, which reduces the risk of for example radio link failures due to too many retransmissions.

In this example, the request further commands the user equipment 125 to prepare for receiving the downlink data from both the first base station 105 via the first cell 115, and from the second base station 110 via the second cell 120.

The user equipment 125 receives the message and, in action 204, the user equipment 125 prepares for sending the uplink data in separate intra frequency transmissions both via the first cell 115 and via the second cell 120.

In this example, the user equipment 125 also prepares for receiving downlink transmissions both from the first base station 105 via the first cell 115, and from the second base station 110 via the second cell 120.

The user equipment 125 may be configured by radio resource control connection reconfiguration. The user equipment 125 may in the preparations obtain time alignment and listen to a control channel of the second cell 110.

In action 205, the user equipment 125 sends the uplink data in a first separate intra frequency transmission to the serving first base station 105 via the first cell 115 as was prepared for in action 204.

In action 206, the user equipment 125 sends the same uplink data in a second separate intra frequency transmission to the non-serving, second base station 110 via the second cell 120.

As indicated by the dashed arrow referring to in action 205, the first separate intra frequency transmission performed in action 205 fails in this example. The failure of the first transmission may be due to for example interference. The second transmission performed in action 206, on the other hand, is successful in this example. This is to illustrate, by way of example, a situation where the transmission diversity of the uplink data according to embodiments herein is useful for increasing the chances of successful transmissions of the uplink data, and that, thanks to the transmission diversity provided for in embodiments herein, the uplink data may be successfully transmitted.

In action 207, the second base station forwards the uplink data it has received in action 206 to the first base station 105. Hence, thanks to the uplink data having been sent by the user equipment 125 also via the second cell 120, the transferral of the uplink data to the first base station 105 was successful.

In action 208, the first base station 105 sends the downlink data, which downlink data is intended for the user equipment 125, to the second base station 110.

In action 209, the first base station 105 also sends the same downlink data directly to the user equipment 125. In this example, this transmission of the downlink data directly to the user equipment fails, as indicated by the dashed arrow. However, thanks to the downlink data having been sent also to the second base station, it may still reach the user equipment 125, as will be described in the following action 210.

In action 210, the downlink data is sent from the second base station 110, as prepared for in action 204, to the user equipment 125 via the second cell 120. This transmission of the downlink data to the user equipment 125 is successful. Hence, the downlink data too, reaches its destination thanks to the transmission diversity provided for by embodiments herein.

The above example is intended as a general example to illustrate the concept of embodiments herein, thanks to which an improved transferal of data in the cellular network 100 is achieved. By using more than one base station in the communication with the user equipment 125, a transmission diversity is provided for that results in data being more likely to be successfully transferred in the cellular network 100.

Making use of another, i.e. the second, base station 110 than the serving, first base station 105 for transmissions to and/or from the user equipment 125 may be used to improve handover performance. In the following, two more detailed examples, which are specific to a possible upcoming handover situation, will be described below. Here too, for the sake of clarity, reference will be made to the numerals in FIGS. 1a-1c, as well as to some actions described in relation to in FIG. 2.

Figure 3A:
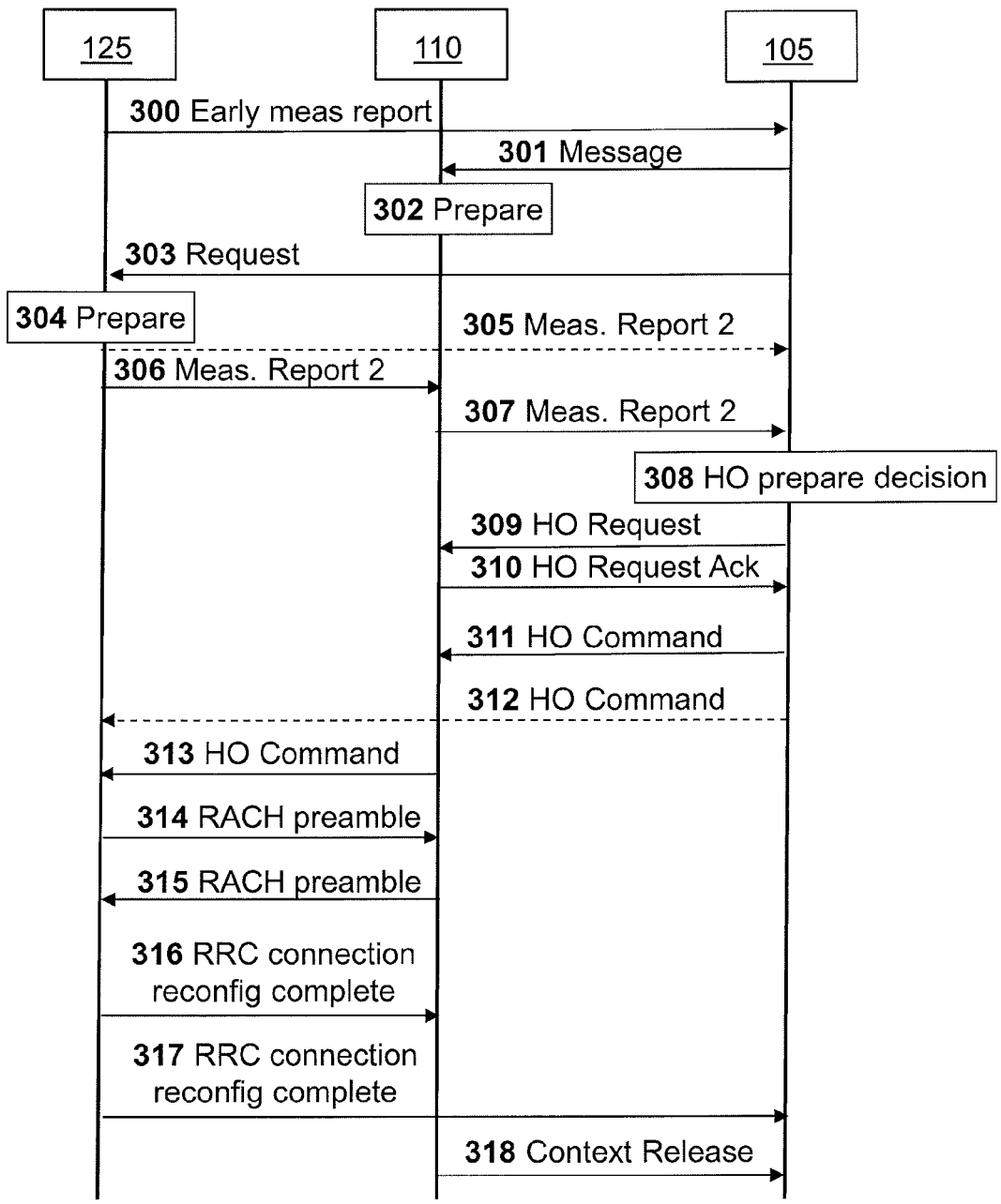
FIG. 3a is a combined signalling scheme and flowchart illustrating embodiments in a cellular network.

FIG. 3a illustrates, by way of example, how a handover situation may be handled in an improved way thanks to embodiments herein.

In action 300 the first base station 105 receives a first measurement report from the user equipment 125. The first measurement report comprises measurement results of measurements that the user equipment 125 has performed on broadcast signals from the first cell 105 and the second cell 110. Such reports are usually used to trigger handover from the first cell 105 to the second cell 110, for example when the report indicates that the signal from the second cell 110 is for example 2 db stronger than the signal from the serving first cell 105. In this case, the first measurement report may be referred to as an early measurement report, since it does not indicate that the second cell 120 is so much better than the first cell 105, that a handover should be triggered.

The first measurement report does however indicate that the second cell 120 provides a coverage for the user equipment 125. In this example, this indication is based on the fact that the signal from the second cell 110 is less than 2 dB better than the signal second cell 105. In other embodiments, the indication may be based on a position information of the user equipment 125.

The obtaining of the first measurement report in action 300 hence corresponds to the previously described action 200 in FIG. 2.

In action 301, the first base station 105 sends the message to the second base station 110, commanding the second base station 110 to prepare for receiving and sending uplink and downlink data to and from the user equipment 125 via the second cell 120, in the same way as previously described in relation to action 201.

In action 302, the preparations are made by the second base station 110, also previously described in relation to action 202.

In action 303, the first base station 105 sends the request to the user equipment 125, commanding the user equipment 125 to prepare for sending the uplink data both to the first base station 105 and to the second base station 110 in separate intra frequency transmissions, as previously described in relation to action 203.

In action 304, the preparations are made by the user equipment 125, as also previously described in relation to action 204.

In actions 305 and 306, the uplink data is sent, in the form of a second measurement report, in separate intra frequency transmissions to both the first base station 105, in action 305, and to the second base station 110, in action 306. In this example too, the transmission in action 305, to the first base station fails.

In action 307, the second base station 110 forwards the uplink data, i.e. the second measurement report in this example, to the first base station 105. This may be done for example using the X2 interface or the S1 interface if the first and second base stations are different base stations, or over an internal interface if the first and second base station is the same base station 140.

In action 308, the first base station 105 decides to prepare for a handover of the user equipment 125 from the first cell 115 to the second cell 120. The decision is based on the second measurement report, which in this example indicates that the signal from the second base station 110 is about 2 dB better than the signal from the first base station 105.

Hence, thanks to the transmission diversity, or soft state, initiated in action 301 and 303, and resulting in the second measurement report being sent also to the second base station 110, the handover preparations can be prepared for even if the second measurement report necessary for triggering the handover preparation did not successfully reach the first base station 105 directly from the user equipment 125.

Actions 309 and 310 refer to signalling related to handover preparation between the first base station 105 and the second base station 110, and are openly included here for the sake of clarity.

In action 311, a handover command is sent from the first base station 105 to the second base station 110.

In action 312, the handover command is sent from the first base station 105 to the user equipment 125. This transmission, however, fails.

In action 313 the handover command is sent from the second base station 110 to the user equipment 125. This transmission is successful. Hence, thanks to the second base station 110 receiving the uplink data, i.e. the second measurement report in this example, in action 306, and sending this downlink data, i.e. the handover command in this example, to the user equipment 125, the handover can still be performed even when the data transferrals of the uplink data and the downlink data between the user equipment 125 and its currently serving base station, i.e. the first base station 1054 failed in actions 305 and 312.

Actions 314 to 318 describe a standard handover execution procedure. It should be noted in this context, that in action 316 and action 317, another uplink data in the form of an RRC connection reconfiguration complete message may also be sent in separate intra frequency transmissions to both the first base station, in action 316, and to the second base station, in action 317. This is hence also an example of the uplink diversity according to embodiments herein. The RRC connection reconfiguration complete message being received via both the first cell 105 and the second cell 120 may speed up the user equipment 125 context release in the first base station 105.

Figure 3B:
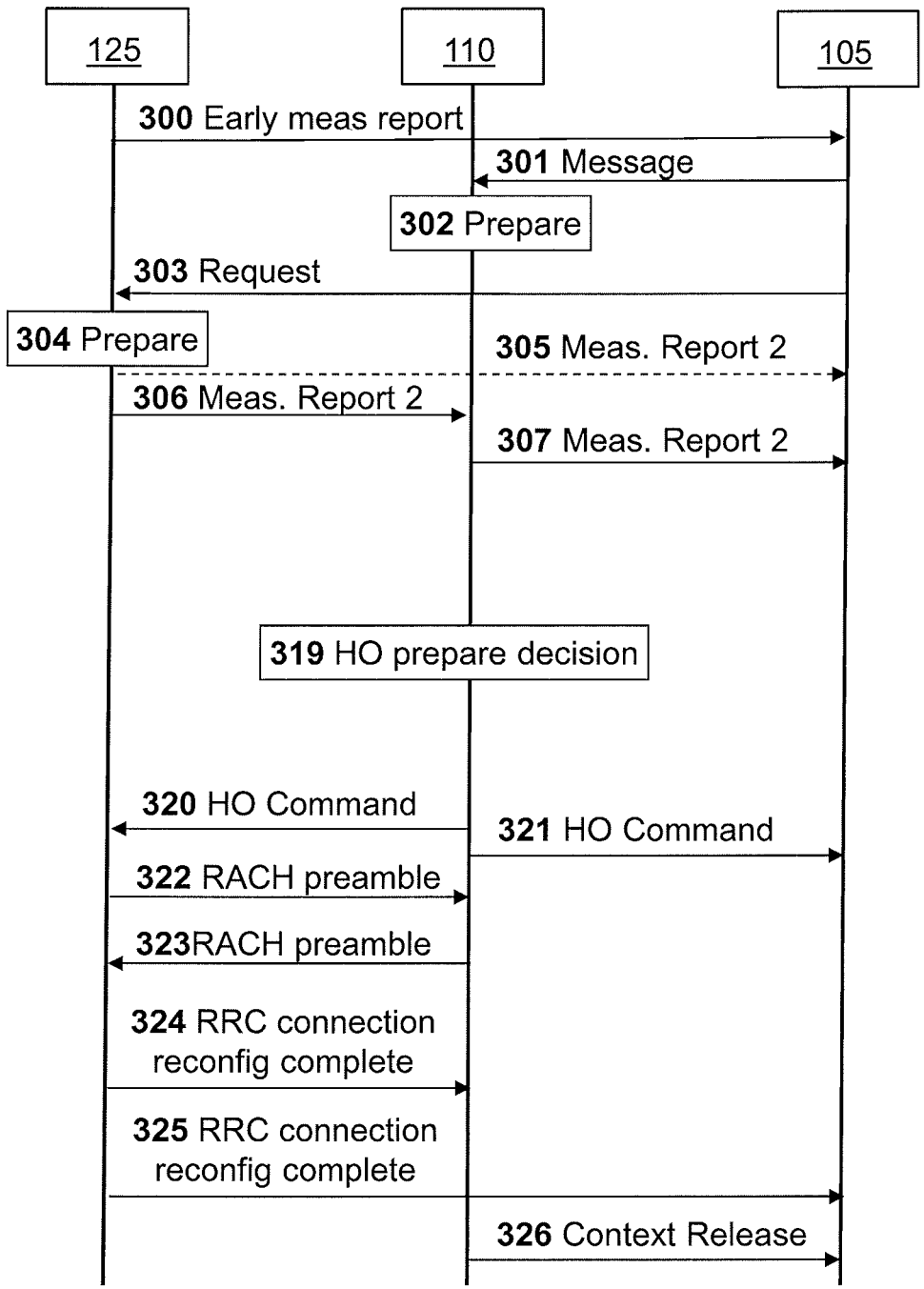
FIG. 3b is a combined signalling scheme and flowchart illustrating embodiments in a cellular network.

FIG. 3b illustrates another handling of a handover scenario according to embodiments herein. Actions 300 to 307 are the same as in the previously described FIG. 3a, and will therefore not be repeated here In action 319, the handover prepare decision is performed by the second base station 110 itself, based on the second measurement report received in action 306.

In action 320, the handover command is sent from the second base station 110 to the user equipment 120.

In action 321, the handover command is sent from the second base station 110 to the first base station 105.

The actions 322-326 correspond to actions 314 to 318 described in relation to FIG. 3b.

FIG. 3b hence illustrates that according to some embodiments herein, the downlink data may be generated in the second base station 120 itself, and not received from the first base station 110. In the illustrated example, the handover is initiated by the second base station 110. This may be efficient since it may speed up the handover procedure, and the user equipment 125 may thanks to this spend less time still being served by the first cell 115 when the second cell 120 provides a better service.

It has been shown and discussed above how embodiments herein may be relevant for handover situations, since they enable a target base station, i.e. the second base station 110, and a source base station, i.e. the first base station 105, to receive uplink data, for example Radio Resource Control (RRC) signaling such as the second measurement report, from the same user equipment 125, and also to transmit downlink data, for example RRC signaling such as for example the handover command, to the same user equipment 125.

Embodiments herein apply to both inter base station and intra base station handover cases.

Also, quality sensitive data radio bearers may use diversity in a similar fashion. For example, in addition to signaling, user data may be sent and received by both the first base station 105 and the second base station 110 to improve the transmission quality.

According to some embodiments herein, the second base station 110 is represented by several second base stations 110. The first base station 105 may hence command one or several second base stations 110 to prepare for receiving uplink data from the user equipment 125 via one or more second cells 115.

Similarly, it is possible according to some embodiments herein for the first base station 105 to also command several second base stations 110 to prepare for transmitting downlink data to the user equipment 125, and to forward uplink data from the user equipment 125 to the first base station 105 via an X2 or an S1 interface.

According to some embodiments, the first base station 105 also commands the user equipment 125 to use more than one cell for radio link failure evaluation, and only trigger radio link failure when all evaluated cells are fulfilling radio link failure criteria. This may be done by commanding it explicitly or implicitly in the request that the first base station send s to the user equipment.

This may avoid unnecessary radio link failures, for example just before or after handover.

It has hence been exemplified that, thanks to embodiments herein, the measurement report that triggers handover, may be received either via the first cell 115 or via the second cell 120. It has further been exemplified that if the second base station 110 receives the measurement report via the second cell 120, it may forward it to the first base station 105, and that the second base station 110 may send a handover command to the user equipment 125 first, and then inform the first base station that it has done so.

When the first base station 105 receives the measurement report, it may start handover preparation and also forward the measurement report and other information to be used for transmission adaptation to the second base station 110.

The involved first cell 115 and second cell 120 may have time synchronized transmission/reception but only on 1-40 ms level may be required.

The first base station 105 may use configured knowledge and/or measurement reports from the user equipment 125 as the indication to decide to send the message.

In some embodiments, the first base station 105 may configure timeouts in the user equipment 125, to be used to stop the user equipment 125 from receiving/and or sending uplink data and/or downlink data via the second cell 120.

This may be useful for example to control the diversity. For example in case of a radio resource shortage, there may be a need to limit the amount of transmission diversity. Also, if the user equipment 125 has not sent the uplink data in the form of a handover triggering measurement report in a certain amount of time, the user equipment 125 may more likely be in a fading condition than a handover situation.

To be able to receive the downlink data via both the first cell 115 and the second cell 120, the user equipment 125 may for a while be scheduled to receive downlink data from both the first base station 105 and the second base station 110, either multiplexed in time, or at the same time.

The selection of which downlink data to use by the user equipment 125 may be done on Cyclic Redundancy Code (CRC) evaluation, and if multiple from both the first cell 115 and the second cell 120 are ok, then the downlink data from the first base station 105 may be used.

The downlink data sent from the different cells to the user equipment 125 may comprise an indication of which cell, and/or base station, that the downlink data is sent from, i.e. an indication of the signaling source for the downlink data.

The identity used to address the user equipment 125 via the first cell 115 and via the second cell 120 cells may be the serving cell allocated Cell Radio Network Temporary ID (C-RNTI) if the first cell 115 and the second cell 120 and target belongs to the same base station 140 as is illustrated in FIG. 1c. When the first cell 115 and the second cell 120 are both served by a common base station 140, information may easily be shared and there may not be a need to allocate for example another identity etc.

As an alternative, the identity to address the user equipment 125 via the second cell 120 cell is one or more C-RNTI values which are configured to be unique per cell relation amongst serving base station, i.e the first base station 110, and adjacent base station's, i.e. one or more second base stations 110, and only be used temporarily to carry out to embodiments herein.

As an option, the first base station 105 may also use this unique identity to implicitly indicate to the user equipment 125 that downlink diversity is used for the downlink data, i.e. that the downlink data may be received via more than one cell.

Embodiments herein may improve handover performance, especially in Hetnet and high user equipment speed scenarios.

Figure 4:
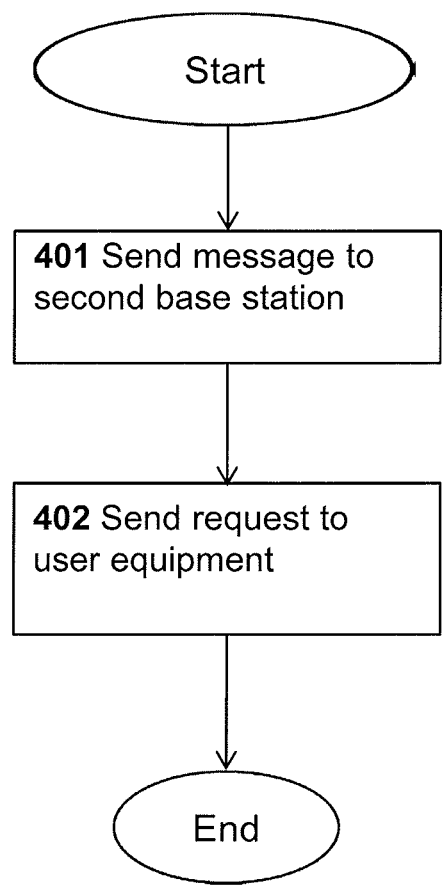
FIG. 4 is a flowchart depicting embodiments of a method in a base station.

Embodiments herein relating to a method in the first base station 105 for handling a data transferral in a cellular network 100 will now be further elaborated and described with reference to the flowchart depicted in FIG. 4. These embodiments will be described in a more general way. As previously mentioned, the first base station 105 serves the user equipment 125 via the first cell 115 in the cellular network 100. The cellular network 100, the first base station 105, the second base station 110, and the user equipment 125 may be of any of the in relation to FIGS. 1a, 1b and 1c previously described types.

According to some embodiments the cellular network 100 is a heterogeneous network, and one of the first base station 105 and the second station 110 is a low-power base station and the other one is a high-power base station.

According to some embodiments, the second cell 120 is served by the first base station 105 and the first base station 105 and the second base station 120 are the same base station 140. The method comprises the following actions, which actions may be taken in any suitable order.

Action 401

When the first base station 105 obtains an indication that the second cell 120 in the cellular network 100 provides a coverage for the user equipment 125, the first base station 105 sends a message to the second base station 110 which serves the second cell 120. The message commands the second base station 110 to prepare for receiving the uplink data from the user equipment 125 via the second cell 120. The first base station 105 also sends a request to the user equipment 125. The request commands the user equipment 125 to prepare for sending the uplink data both via the first cell 115 and via the second cell 120. The request further commands that the uplink data is to be sent via first cell 115 and via the second cell 120 in respective separate intra frequency transmissions.

By "separate intra frequency transmission" is understood sending a cell specific transmission to each of the first base station 105 and the second base station 120 according to specific cell requirements for the respective first cell 115 and second cell 120, while using the same frequency for both transmissions.

The indication may be for example configured knowledge in the first base station 105, and/or measurement reports from the user equipment 125.

By commanding is understood explicit or implicit commanding.

According to some embodiments, the message further commands the second base station 110 to prepare for sending a downlink data to the user equipment 125 via the second cell 120.

According to some embodiments, the message further commands the second base station 110 to forward the uplink data to the first base station 105.

According to some embodiments, the indication is a measurement report from the user equipment 125, which measurement report indicates that the second cell 120 is a candidate cell for a handover of the user equipment 125. The measurement report may be an early measurement report, i.e. a measurement report that do not trigger a handover.

In some embodiments, the message is sent over an X2 interface or over an S1 interface.

In embodiments, where the second cell 120 is served by the first base station 105, and the first base station 105 and the second base station 120 hence are the same base station, the message may be sent internally in the first base station 105.

Action 402

The first base station 105 also sends a request to the user equipment 125. The request commands the user equipment 125 to prepare for sending the uplink data both via the first cell 115 and via the second cell 120. The request further commands that the uplink data is to be sent via first cell 115 and via the second cell 120 in respective separate intra frequency transmissions.

According to some embodiments, the request further commands the user equipment 125 to prepare for receiving the downlink data both via the first cell 110 and via the second cell 120.

According to some embodiments, the request further commands the user equipment 125 to perform a first radio link failure evaluation on the first cell 115 and a second radio link failure evaluation on the second cell 120. The radio link failure is then only to be determined when a result of both the first and evaluation and a result of the second evaluation indicate radio link failure.

This way, the user equipment 125 may use reception of transmissions from the second cell 110 and reception of transmissions from the first cell 105 in parallel for radio link failure evaluation, and avoid unnecessary triggering of radio link failure if one of the evaluated transmissions is satisfactory. This is advantageous since it may avoid radio link failures for example just before or after a handover.

Hence according to some embodiments herein, thanks to the provision of for example radio link failure and radio resource control signaling diversity at handover, handover failures caused by radio link failure or radio resource control signaling failures may be avoided.

The uplink data and/or the downlink data may comprise RRC signalling, such as for example one or more of a time alignment adjustment, a user data and/or a radio bearer.

According to some embodiments, the uplink data comprises a measurement report and/or the downlink data comprises a handover command.

According to some embodiments, the request and/or the message further commands that the uplink data and/or the downlink data is to be sent and/or received in predetermined subframes.

The predetermined subframes may comprise separate subframes for transmission via the first cell 115 and other subframes for transmission via the second cell 120. There may be more subframes allocated for transmissions via the first cell 115, since this is the serving cell of the user equipment 125. The predetermined subframes may be for example almost blank subframes.

Figure 5:
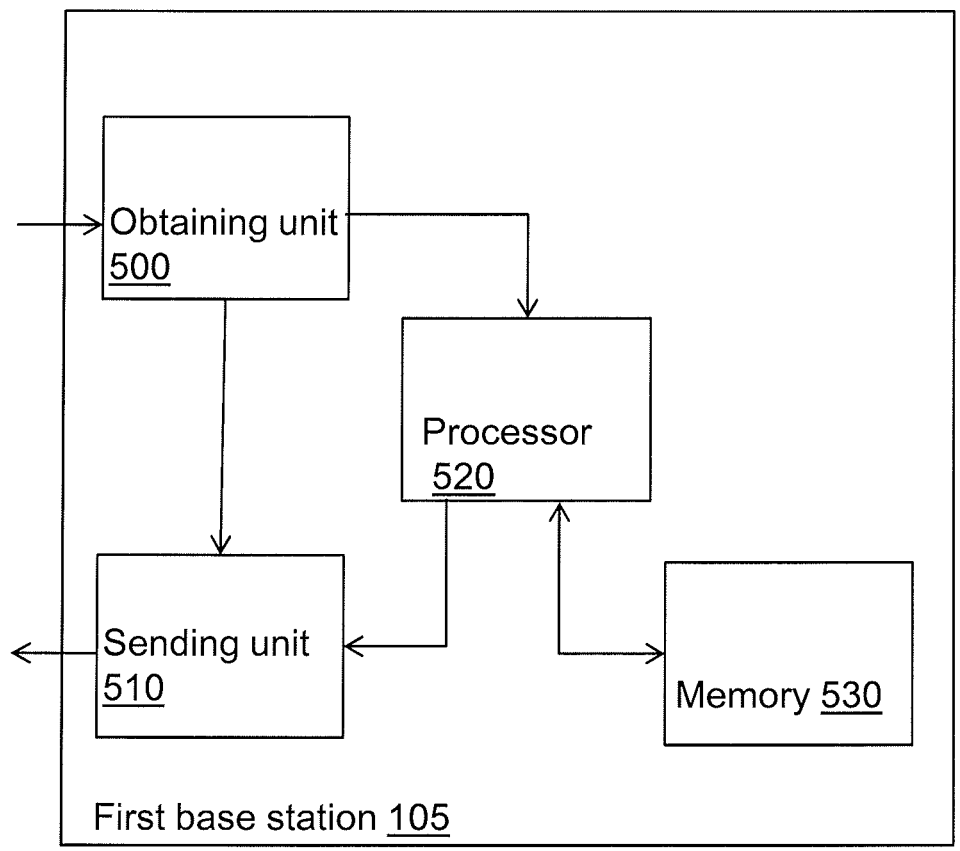
FIG. 5 is a schematic block diagram illustrating embodiments of a base station.

To perform the actions above for handling a data transferal in the cellular network 100, the first base station 105 comprises an arrangement schematically depicted in FIG. 5. As mentioned above, the first base station 105 is configured to serve the user equipment 125 via the first cell 115 in the cellular network 100. The cellular network 100, the first base station 105, the second base station 110, and the user equipment 125 may be of any of the in relation to FIGS. 1a, 1b and 1c previously described types.

According to some embodiments, the cellular network 100 is a heterogeneous network, and the first base station 105 and the second station 110 is a low-power base station and the other one is a high-power base station.

According to some embodiments, the second cell 120 is served by the first base station 105, and the first base station 105 and the second base station 110 are the same base station 140.

The term "configured to" used herein may also be referred to as "arranged to".

The term "unit" used herein may comprise hardware circuitry and/or comprise a software implementation.

The first base station 105 comprises an obtaining unit 500. The obtaining unit 500 is configured to obtain an indication that the second cell 120 in the cellular network 100 provides a coverage for the user equipment 125.

The first base station 105 further comprises a sending unit 510. The sending unit 510 is configured to, when an indication that the second cell 120 in the cellular network 100 provides a coverage for the user equipment is obtained, send a message to the second base station 110 serving the second cell 120. The message commands the second base station 110 to prepare for receiving the uplink data from the user equipment 125 via the second cell 120. The sending unit 510 is further configured to send a request to the user equipment 125. The request commands the user equipment 125 to prepare for sending the uplink data both via the first cell 115 and via the second cell 120. The request further commands that the uplink data is to be sent via first cell 115 and via the second cell 120 in respective separate intra frequency transmissions.

According to some embodiments, the message further commands the second base station 110 to prepare for sending a downlink data to the user equipment 125 via the second cell 120, and the request further commands the user equipment 125 to prepare for receiving the downlink data both via the first cell 110 and via the second cell 120.

According to some embodiments, the request further commands the user equipment 125 to perform a first radio link failure evaluation on the first cell 115 and a second radio link failure evaluation on the second cell 120. The radio link failure may then only to be determined when a result of both the first radio link failure evaluation and a result of the second radio link failure evaluation indicate radio link failure.

According to some embodiments, the message further commands the second base station 110 to forward the uplink data to the first base station 105.

According to some embodiments, the indication is a measurement report from the user equipment 125, which measurement report indicates that the second cell 120 is a candidate cell for a handover of the user equipment 125.

According to some embodiments, the uplink data comprises a measurement report and/or the downlink data comprises a handover command.

According to some embodiments, the request and/or the message further commands that the uplink and/or the downlink data is to be sent and/or received in predetermined subframes.

In some embodiments, the sending unit 510 is configured to send the message over an X2 interface, or over an S1 interface.

In embodiments, when the second cell 120 is served by the first base station 105, and the first base station 105 and the second base station 110 are the same base station 140, the sending unit 510 may further be configured to send the message internally in the first base station 105.

The embodiments of the first base station 105 for handling a data transferal in the cellular network 100, may be implemented through one or more processors, such as a processor 520 in the first base station 105 depicted in FIG. 5, together with computer program code for performing the actions of embodiments herein.

The program code mentioned above may also be provided as a computer program product, for instance in the form of a data carrier carrying computer program code for performing the embodiments herein when being loaded into the first base station 105.

One such carrier may be in the form of a CD ROM disc. It is however feasible with other data carriers such as a memory stick. The computer program code may furthermore be provided as pure program code on a server and downloaded to the first base station 105 e.g. remotely.

The first base station 105 may further comprise a memory 530 comprising one or more memory units. The memory 530 is arranged to be used to store data such as for example the indication, the uplink data, and/or the downlink data. It may further be arranged to store applications to perform the actions of the embodiments herein when being executed in the first base station 105.

Figure 6:
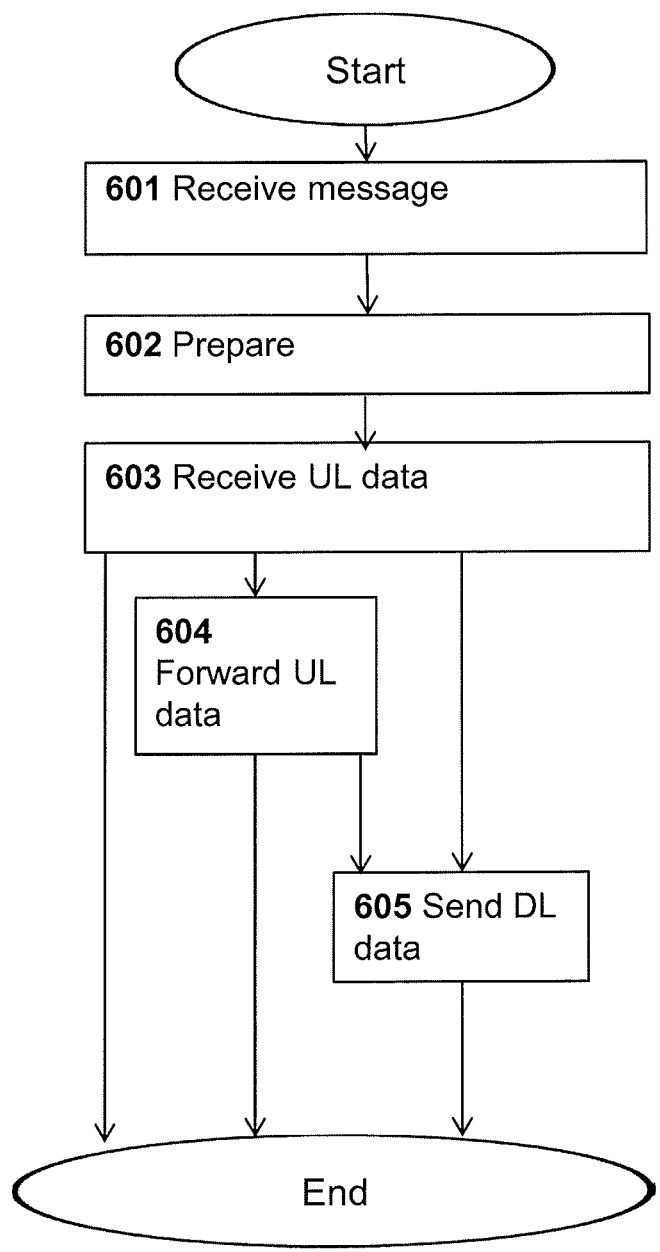
FIG. 6 is a flowchart depicting embodiments of a method in a base station.

Embodiments herein relating to a method in the second base station 110 for handling a data transferral in a cellular network 100 will now be further elaborated and described with reference to the flowchart depicted in FIG. 6. These embodiments will also be described in a more general way. As previously mentioned, the cellular network 100 comprises the first base station 105 that serves the user equipment 125 via the first cell 115 in the cellular network 100. As also previously mentioned, the second base station 110 serves a second cell 120 in the cellular network 100. The cellular network 100, the first base station 105, the second base station 110, and the user equipment 125 may be of any of the in relation to FIGS. 1a, 1b and 1c previously described types.

According to some embodiments, the cellular network 100 is a heterogeneous network, and one of the first base station 105 and the second station 110 is a low-power base station and the other one is a high-power base station.

According to some embodiments, the second cell 120 is served by the first base station 105 and the first base station 105 and the second base station 110 are the same base station 140.

The method comprises the following actions, which actions may be taken in any suitable order.

In action 601 the second base station 110 receives a message from the first base station 105. The message commands the second base station 110 to prepare for receiving an uplink data from the user equipment 125 via the second cell 120.

According to some embodiments, the message further commands the second base station 110 to prepare for sending a downlink data to the user equipment 125 via the second cell 120.

According to some embodiments, the message further commands the second base station 110 to forward the uplink data to the first base station 105.

According to some embodiments, the message further commands that the uplink data and/or the downlink data is to be sent and/or received by the second base station 110 in predetermined subframes.

In action 602 the second base station 110 prepares for receiving the uplink data from the user equipment 125 via the second cell 120.

According to some embodiments, the preparing may further comprises preparing for sending a downlink data to the user equipment 125 via the second cell 120.

According to some embodiments, the preparing further comprises preparing for the uplink data and/or the downlink data to be sent and/or received in the predetermined subframes.

In action 603 the second base station 110 receives the uplink data from the user equipment 125 via the second cell 120.

In action 604 which is an optional action, the second base station 110 further forwards the in action 603 received uplink data to the first base station 105.

In action 605, which is also an optional action, the second base station 110 sends a downlink data to the user equipment 125 via the second cell 120.

According to some embodiments, the uplink data comprises a measurement report and/or the downlink data comprises a handover command.

In embodiments wherein the second cell 120 is served by the first base station 105, and the first base station 105 and the second base station 110 are the same base station 140, the message may be received internally in the second base station 110.

Figure 7:
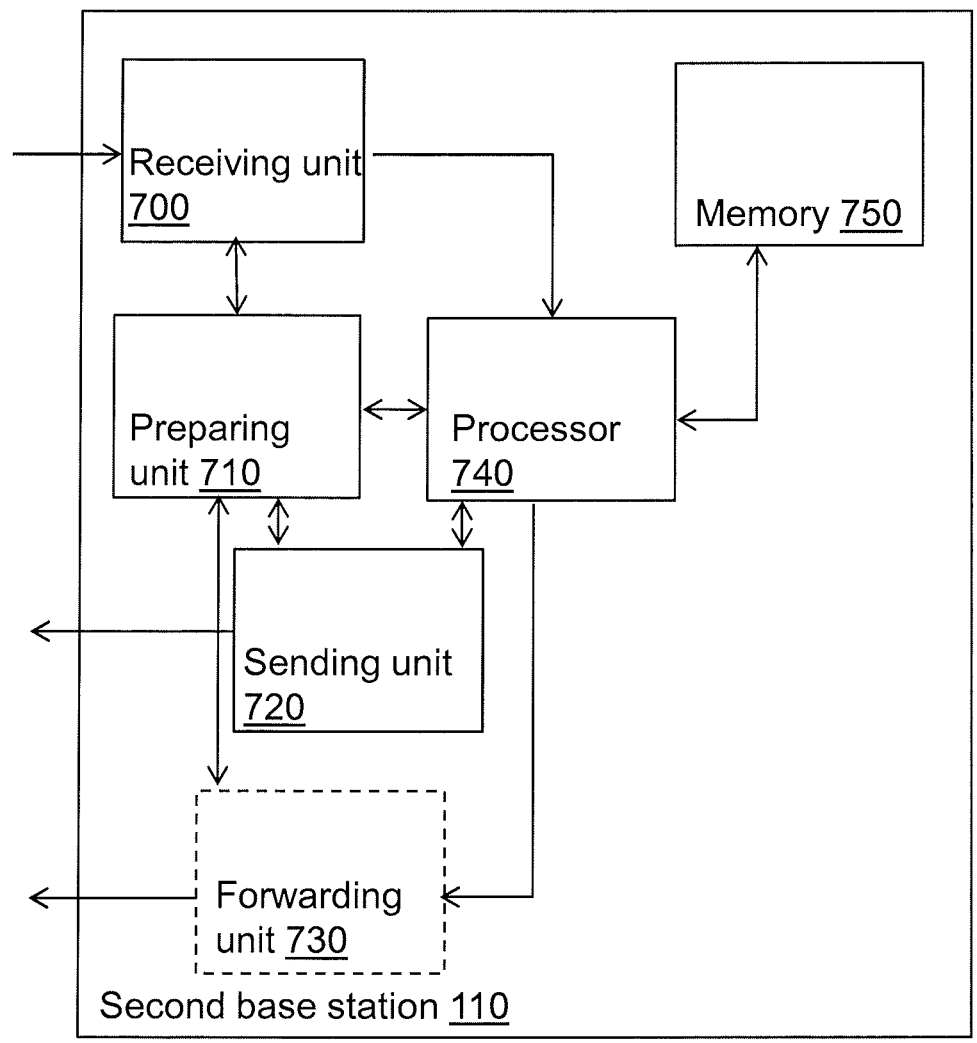
FIG. 7 is a schematic block diagram illustrating embodiments of a base station.

To perform the actions above for handling a data transferal in the cellular network 100, the second base station 110 comprises an arrangement schematically depicted in FIG. 7. As mentioned above, the cellular network 100 comprises the first base station 105 that serves a user equipment 125 via a first cell 115 in the cellular network 100. As also previously mentioned, the second base station 110 is configured to serve the second cell 120 in the cellular network 100. The cellular network 100, the first base station 105, the second base station 110, and the user equipment 125 may be of any of the in relation to FIGS. 1a, 1b and 1c previously described types.

According to some embodiments, the cellular network 100 is a heterogeneous network, and one of the first base station 105 and the second station 110 is a low-power base station and the other one is a high-power base station.

According to some embodiments, the second cell 120 is served by the first base station 105 and the first base station 105 and the second base station 110 are the same base station 140.

The second base station 110 comprises a receiving unit 700. The receiving unit 700 is configured to receive a message from the first base station 105.

The message commands the second base station 110 to prepare for receiving an uplink data from the user equipment 125 via the second cell 120.

According to some embodiments, the message further commands the second base station 110 to prepare for sending a downlink data to the user equipment 125 via the second cell 120.

According to some embodiments, the message further commands the second base station 110 to forward the uplink data to the first base station 105.

According to some embodiments, the uplink data comprises a measurement report and/or the downlink data comprises a handover command.

According to some embodiments, the message further commands that the uplink data and/or the downlink data is to be sent and/or received in predetermined subframes by the second base station 110.

According to some embodiments, wherein the second cell 120 is served by the first base station 105 and the first base station 105 and the second base station 110 are the same base station 140, the message is received internally in the second base station 110.

The second base station 110 further comprises a preparing unit 710. The preparing unit 710 is configured to prepare for receiving of the uplink data from the user equipment 125 via the second cell 120.

The second base station 110 further comprises a sending unit 720.

According to some embodiments, the preparing unit 710 is further configured to prepare for sending the downlink data to the user equipment 125 via the second cell 120.

According to some embodiments, the preparing unit 710 is further configured to prepare for the uplink data and/or the downlink data to be sent and/or received in the predetermined subframes.

According to some embodiments, the second base station further comprises a forwarding unit 730 configured to forward the received uplink data to the first base station 105.

According to some embodiments, the cellular network 100 is a heterogeneous network, and one of the first base station 105 and the second station 110 is a low-power base station and the other one is a high-power base station.

The embodiments of the second base station 110 for handling a data transferal in the cellular network 100, may be implemented through one or more processors, such as a processor 740 in the second base station 110 depicted in FIG. 7, together with computer program code for performing the actions of embodiments herein.

The program code mentioned above may also be provided as a computer program product, for instance in the form of a data carrier carrying computer program code for performing the embodiments herein when being loaded into the second base station 110.

One such carrier may be in the form of a CD ROM disc. It is however feasible with other data carriers such as a memory stick. The computer program code may furthermore be provided as pure program code on a server and downloaded to the second base station 110 e.g. remotely.

The second base station 110 may further comprise a memory 750 comprising one or more memory units. The memory 750 may be arranged to be used to store data such as for example the uplink data, and/or the downlink data. It may further be arranged to store applications to perform the actions of the embodiments herein when being executed in the second base station 110.

Figure 8:
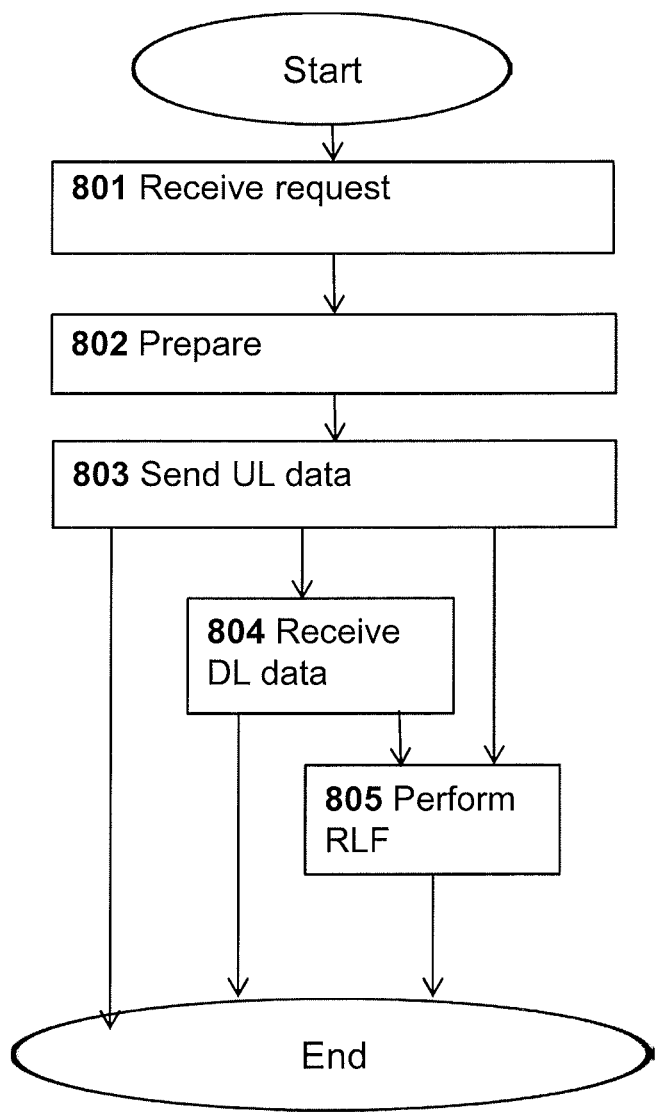
FIG. 8 is a flowchart depicting embodiments of a method in a user equipment.

Embodiments herein relating to a method in the user equipment 125 for handling a data transferral in a cellular network 100 will now be further elaborated and described with reference to the flowchart depicted in FIG. 8. These embodiments too will be described in a more general way. As previously mentioned, the user equipment 125 is served by the first base station 105 via the first cell 115 in the cellular network 100. The cellular network 100, the first base station 105, the second base station 110, and the user equipment 125 may be of any of the in relation to FIGS. 1a, 1b and 1c previously described types. The method comprises the following actions, which actions may be taken in any suitable order.

In action 801, the user equipment 125 receives a request from the first base station 105. The request commands the user equipment 125 to prepare for sending an uplink data both via the first cell 115 and via the second cell 120 comprised in the cellular network 100. The request further commands that the uplink data is to be sent via the first cell 115 and via the second cell 120 in respective separate intra frequency transmissions.

According to some embodiments, the request further commands the user equipment 125 to prepare for receiving a downlink data both via the first cell 115 and via the second cell 120.

According to some embodiments, the request further commands the user equipment 125 to perform a first radio link failure evaluation on the first cell 115, and a second radio link failure evaluation on the second cell 120, and to only determine radio link failure when a result of both the first radio link failure evaluation and a result of the second radio link failure evaluation indicate radio link failure.

According to some embodiments, the request further commands that the uplink data and/or the downlink data is to be sent and/or received by the user equipment 125 in predetermined subframes.

In action 802, the user equipment 125 prepares for sending the uplink data via the first cell 115 and via the second cell 120 in respective separate intra frequency transmissions.

According to some embodiments, the preparing further comprises preparing for receiving the downlink data both via the first cell 115 and via the second cell 120.

According to some embodiments, the preparing further comprises preparing for the uplink data and/or the downlink data to be sent and/or received in the predetermined subframes.

In action 803, the user equipment 125 sends the uplink data via the first cell 115 and via the second cell 120 in respective separate intra frequency transmissions.

In action 804, which is an optional action, the user equipment 125 receives the downlink data via the second cell 120.

In action 805, which also is an optional action, the user equipment 125 performs the first and second radio link failure evaluations.

According to some embodiments, the uplink data comprises a measurement report and/or the downlink data comprises a handover command.

Figure 9:
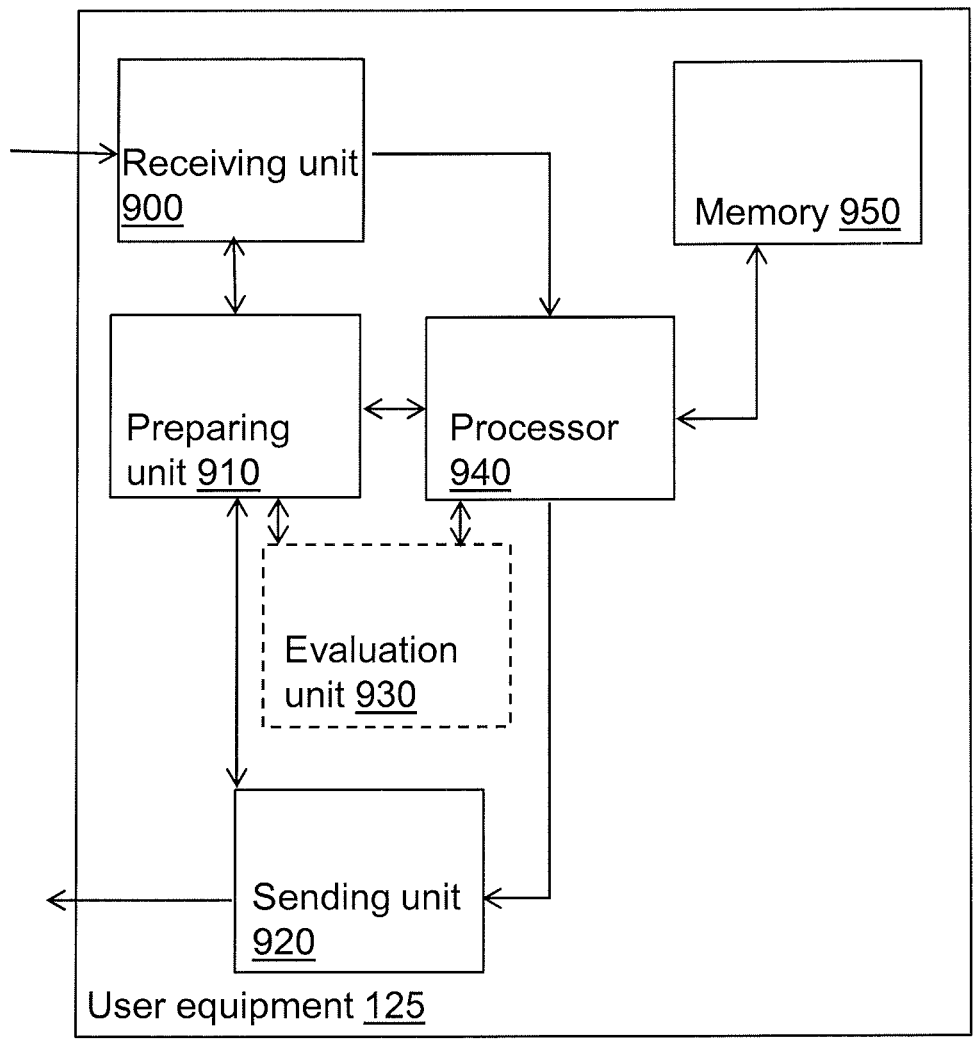
FIG. 9 is a schematic block diagram illustrating embodiments of a user equipment.

To perform the actions above for handling a data transferal in the cellular network 100, the user equipment 125 comprises an arrangement schematically depicted in FIG. 9. The user equipment 125 is configured to be served by the first base station 105 via the first cell 115 in the cellular network 100. The cellular network 100, the first base station 105, the second base station 110, and the user equipment 125 may be of any of the in relation to FIGS. 1a, 1b and 1c previously described types.

The user equipment 125 comprises a receiving unit 900. The receiving unit 900 is configured to receive a request from the first base station 105.

The request commands the user equipment 125 to prepare for sending an uplink data both via the first cell 115 and via a second cell 120 comprised in the cellular network 100. The request further commands that the uplink data is to be sent via the first cell 115 and via the second cell 120 in respective separate intra frequency transmissions.

According to some embodiments, the request further commands the user equipment 125 to prepare for receiving a downlink data both from the first cell 115 and from the second cell 120.

According to some embodiments, the request further commands the user equipment 125 to perform a first radio link failure evaluation on the first cell 115, and a second radio link failure evaluation on the second cell 120, and wherein radio link failure is only to be determined when a result of both the first radio link failure evaluation and a result of the second radio link failure evaluation indicate radio link failure.

According to some embodiments, the request further commands that the uplink data and/or the downlink data is to be sent and/or received in by the user equipment 125 in predetermined subframes.

The user equipment 125 further comprises a preparing unit 910. The preparing unit 910 is configured to prepare for sending the uplink data via the first cell 115 and via the second cell 120 in respective separate intra frequency transmissions.

According to some embodiments, the preparing unit 910 is further configured to prepare for receiving the downlink data both via the first cell 115 and via the second cell 120.

The user equipment 125 further comprises a sending unit 920.

According to some embodiments, the preparing unit 910 is further configured to prepare for the uplink data and/or the downlink data to be sent and/or received in the predetermined subframes.

According to some embodiments, the user equipment 125 further comprises an evaluation unit 930 configured to perform the first and second radio link failure evaluations.

According to some embodiments, the uplink data comprises a measurement report and/or the downlink data comprises a handover command.

The embodiments of the user equipment 125 for handling a data transferal in the cellular network 100, may be implemented through one or more processors, such as a processor 940 in the user equipment 125 depicted in FIG. 9, together with computer program code for performing the actions of embodiments herein.

The program code mentioned above may also be provided as a computer program product, for instance in the form of a data carrier carrying computer program code for performing the embodiments herein when being loaded into the user equipment 125.

One such carrier may be in the form of a CD ROM disc. It is however feasible with other data carriers such as a memory stick. The computer program code may furthermore be provided as pure program code on a server and downloaded to the user equipment 125 e.g. remotely.

The user equipment 125 may further comprise a memory 950 comprising one or more memory units. The memory 950 may be arranged to be used to store data such as for example the uplink data, and/or the downlink data. It may further be arranged to store applications to perform the actions of the embodiments herein when being executed in the user equipment 125.

The embodiments herein are not limited to the above described embodiments. Various alternatives, modifications and equivalents may be used. Therefore, the above embodiments should not be taken as limiting the scope of the invention, which is defined by the appending claims.

In LTE, the user equipment uses transmission from one cell at a time unless multi carrier operation is used, as opposed to WCDMA and CDMA technologies where the user equipment combines and use transmissions from one or several cells simultaneously. Note that a cell can still have one or several antenna ports. Field experience from WCDMA indicates that soft handover techniques address the short comings of the above mentioned solutions in a better way, both in terms of planning efforts and actual field performance.

A significant difference between LTE and WCDMA/CDMA is that in LTE the user equipment 125 cannot diversity combine the transmission from several cells on physical layer before providing the data to upper layers. In WCDMA, the received symbols from different cells are combined before decoding and CRC evaluation. This is not possible in LTE, and it is not possible to choose the best transmission based on CRC evaluation either.

Embodiments herein makes use of the understanding that it is possible to in LTE use several cells for transmission of data as long as the user equipment 125 perceives the transmission as coming from one cell only, optionally from multiple antenna ports. This may be achieved by using the same Cell Specific Reference Symbols, Physical cell identities and identical transmissions from the cells.

There are several known methods for alleviating handover problems.

These existing solutions may be problematic since they require planning efforts or complex implementations, and may still lack in performance, as will be further explained below.

Interference problems have been addressed by various solutions such as beam forming, Inter Cell Interference Coordination (ICIC) schemes, or interference suppression schemes like Interference Rejection Combining (IRC).

Too early and too late handovers and oscillations has been addressed by Self Organizing Network (SON) type of tuning of handover parameters like e.g. event A3 criteria on a user equipment, cell, and cell relation level. Also, cell coverage planning has been used to mitigate handover problems.

A user equipment speed estimate may be used to further improve the handover tuning on a user equipment individual basis or cell relation basis.

User equipment radio link failure detection and user equipment autonomous triggered Radio Resource Control (RRC) connection re-establishment procedure is a known method used as a technique to avoid losing a RRC connection permanently, and by that reducing delay and signaling associated with having to setup a RRC connection from idle mode.

Carrier aggregation solutions introduced for LTE in 3GPP rel. 10 allow DL and UL transmission from/to several cells on different carriers at the same time, the common part is the Radio Link Control (RLC) termination point so any transmission split onto different carriers need to be done below RLC layer. RLC Protocol Data Unit (PDU)1 goes through carrier 1 and RLC PDU2 goes through carrier 2. The difference is that in carrier aggregation the data is split and two carriers work together to finish the transmission. According to embodiments herein, data is transmitted to both base stations in two separate transmissions independently of each other.

Carrier aggregation solutions require DL and UL transmission from several cells with different carrier frequencies.

DL comp (Coordinated Multipoint transmission/reception) and UL comp is a family of solutions also allowing transmission to/from several cells to/from one user equipment, but typically comp schemes require coordinated scheduling or joint transmission/reception/processing on physical level from different cells.

DL and UL Comp require coordinated scheduling, processing and transmission to be done jointly and thus require very high capacity and low latency Backhaul between transmission/reception points Remote Radio Units (RRU's). Both inter-eNodeB and RRU solutions require low latency backhaul.

The invention claimed is:

1. A method in a first base station for handling a data transferral in a cellular network, which first base station serves a user equipment via a first cell in the cellular network, the method comprising:
   when obtaining an indication that a second cell in the cellular network provides a coverage for the user equipment,
   sending a message to a second base station serving the second cell, which message commands the second base station to prepare for receiving a measurement report from the user equipment via the second cell, and
   sending a request to the user equipment, which request commands the user equipment to prepare for sending the measurement report to the first base station via the first cell and to prepare for sending the same measurement report to the second base station via the second cell, and wherein the request further commands that the measurement report is to be sent to the first base station via the first cell and to the second base station via the second cell in respective separate intra frequency transmissions.

2. The method according to claim 1, wherein the message further commands the second base station to prepare for sending a downlink data to the user equipment via the second cell, and wherein the request further commands the user equipment to prepare for receiving the downlink data both via the first cell and via the second cell.

3. The method according to claim 1, wherein the request further commands the user equipment to perform a first radio link failure evaluation on the first cell, and a second radio link failure evaluation on the second cell, and wherein radio link failure is only to be determined when a result of both the first radio link failure evaluation and a result of the second radio link failure evaluation indicate radio link failure.

4. The method according to claim 1, wherein the message further commands the second base station to forward the measurement report to the first base station.

5. The method according to claim 1, wherein the indication is a measurement report from the user equipment, which measurement report indicates that the second cell is a candidate cell for a handover of the user equipment.

6. The method according to claim 1, wherein the downlink data comprises a handover command.

7. The method according to claim 1, wherein the request and/or the message further commands that the measurement report and/or downlink data is to be sent and/or received in predetermined subframes.

8. A first base station for handling a data transferral in a cellular network, which first base station is configured to serve a user equipment via a first cell in the cellular network, the first base station comprising:
   one or more processors, the one or more processors configured to:
   obtain an indication that a second cell in the cellular network provides a coverage for the user equipment, and
   when an indication that the second cell in the cellular network provides a coverage for the user equipment is obtained, send a message to a second base station serving the second cell, which message commands the second base station to prepare for receiving a measurement report from the user equipment via the second cell, and to send a request to the user equipment, which request commands the user equipment to prepare for sending the measurement report to the first base station via the first cell and to prepare for sending the same measurement report to the second base station via the second cell, and wherein the request further commands that the measurement report is to be sent to the first base station via the first cell and to the second base station via the second cell in respective separate intra frequency transmissions.

9. The first base station according to claim 8, wherein the message further commands the second base station to prepare for sending a downlink data to the user equipment via the second cell, and wherein the request further commands the user equipment to prepare for receiving the downlink data both via the first cell and via the second cell.

10. The first base station according to claim 8, wherein the request further commands the user equipment to perform a first radio link failure evaluation on the first cell and a second radio link failure evaluation on the second cell, and wherein radio link failure is only to be determined when a result of both the first radio link failure evaluation and a result of the second radio link failure evaluation indicate radio link failure.

11. The first base station according to claim 8, wherein the message further commands the second base station to forward the measurement report to the first base station.

12. The first base station according to claim 8, wherein the indication is a measurement report from the user equipment, which measurement report indicates that the second cell is a candidate cell for a handover of the user equipment.

13. The first base station according to claim 8, wherein the downlink data comprises a handover command.

14. The first base station according to claim 8, wherein the request and/or the message further commands that the measurement report and/or the downlink data is to be sent and/or received in predetermined subframes.

15. A method in a second base station for handling a data transferral in a cellular network, which cellular network comprises a first base station that serves a user equipment via a first cell in the cellular network, wherein the second base station serves a second cell in the cellular network, the method comprising
   receiving from the first base station a message, wherein the message commands the second base station to prepare for receiving a measurement report from the user equipment via the second cell and to forward the measurement report to the first base station,
   preparing for receiving the measurement report from the user equipment via the second cell, and
   receiving the measurement report from the user equipment via the second cell.

16. The method according to claim 15, wherein the message further commands the second base station to prepare for sending a downlink data to the user equipment via the second cell, and wherein the preparing further comprises preparing for sending a downlink data to the user equipment via the second cell, and wherein the method further comprising sending the downlink data to the user equipment via the second cell.

17. The method according to claim 15, wherein the method further comprises forwarding the received measurement report to the first base station.

18. The method according to claim 16, wherein the downlink data comprises a handover command.

19. The method according to claim 15, wherein the message further commands that the measurement report and/or the downlink data is to be sent and/or received by the second base station in predetermined subframes, and wherein the preparing further comprises preparing for the measurement report and/or the downlink data to be sent and/or received in the predetermined subframes.

20. A second base station for handling a data transferral in a cellular network, which cellular network comprises a first base station that serves a user equipment via a first cell in the cellular network, wherein the second base station is configured to serve a second cell in the cellular network, the second base station comprising:
   a receiver;
   a transmitter; and
   one or more processors coupled to the receiver and the transmitter, the one or more processors configured to:

receive from the first base station a message, wherein the message commands the second base station to prepare for receiving a measurement report from the user equipment via the second cell and to forward the measurement report to the first base station, and prepare for receiving of the measurement report from the user equipment via the second cell.

21. The second base station according to claim 20, wherein the message further commands the second base station to prepare for sending a downlink data to the user equipment via the second cell, and wherein the one or more processors are further configured to prepare for sending the downlink data to the user equipment via the second cell from the sending unit.

22. The second base station according to claim 20, wherein the one or more processors are further configured to forward the received measurement report to the first base station.

23. The second base station according to claim 20, wherein the downlink data comprises a handover command.

24. The second base station according to claim 20, wherein the message further commands that the measurement report and/or the downlink data is to be sent and/or received in predetermined subframes by the second base station, and wherein the one or more processors are further configured to prepare for the measurement report and/or the downlink data to be sent and/or received in the predetermined subframes.

25. A method in a user equipment for handling a data transferral in a cellular network, which user equipment is served by a first base station via a first cell in the cellular network, the method comprising:

receiving a request from the first base station, which request commands the user equipment to prepare for sending a measurement report to the first base station via the first cell and to prepare for sending the same measurement report to the second base station via a second cell comprised in the cellular network, and wherein the request further commands that the measurement report is to be sent to the first base station via the first cell and to the second base station via the second cell in respective separate intra frequency transmissions, preparing for sending the measurement report to the first base station via the first cell and to the second base station via the second cell in respective separate intra frequency transmissions, and sending the measurement report to the first base station via the first cell and to the second base station via the second cell in respective separate intra frequency transmissions.

26. The method according to claim 25, wherein the request further commands the user equipment to prepare for receiving a downlink data both via the first cell and via the second cell, wherein the preparing further comprises preparing for receiving the downlink data both via the first cell and via the second cell, and wherein the method further comprises receiving the downlink data via the second cell.

27. The method according to claim 25, wherein the request further commands the user equipment to perform a first radio link failure evaluation on the first cell, and a second radio link failure evaluation on the second cell, and wherein radio link failure is only to be determined when a result of both the first radio link failure evaluation and a result of the second radio link failure evaluation indicate radio link failure, the method further comprising performing the first and second radio link failure evaluations.

28. The method according to claim 25, wherein the downlink data comprises a handover command.

29. The method according to claim 25, wherein the request further commands that the measurement report and/or the downlink data is to be sent and/or received by the user equipment in predetermined subframes, and wherein the preparing further comprises preparing for the measurement report and/or the downlink data to be sent and/or received in the predetermined subframes.

30. A user equipment for handling a data transferral in a cellular network, which user equipment is configured to be served by a first base station via a first cell in the cellular network, the user equipment comprising:

a receiver;

a transmitter; and one or more processors coupled to the receiver and the transmitter, the one or more processors configured to:

receive a request from the first base station, which request commands the user equipment to prepare for sending a measurement report to the first base station via the first cell and to prepare for sending the same measurement report to a second base station via a second cell comprised in the cellular network, and wherein the request further commands that the measurement report is to be sent to the first base station via the first cell and to the second base station via the second cell in respective separate intra frequency transmissions, prepare for sending the measurement report via the first cell and via the second cell in respective separate intra frequency transmissions.

31. The user equipment according to claim 30, wherein the request further commands the user equipment to prepare for receiving a downlink data both from the first cell and from the second cell, and wherein the one or more processors are further configured to prepare for receiving the downlink data both via the first cell and via the second cell.

32. The user equipment according to claim 30, wherein the request further commands the user equipment to perform a first radio link failure evaluation on the first cell, and a second radio link failure evaluation on the second cell, and wherein radio link failure is only to be determined when a result of both the first radio link failure evaluation and a result of the second radio link failure evaluation indicate radio link failure, and wherein the one or more processors are further configured to perform the first and second radio link failure evaluations.

33. The user equipment according to claim 30, wherein the downlink data comprises a handover command.

34. The user equipment according to claim 30, wherein the request further commands that the measurement report and/or the downlink data is to be sent and/or received by the user equipment in predetermined subframes, and wherein the one or more processors are further configured to prepare for the measurement report and/or the downlink data to be sent and/or received in the predetermined subframes.

* * * * *